United States Patent
Yokoyama et al.

(10) Patent No.: US 7,126,652 B2
(45) Date of Patent: *Oct. 24, 2006

(54) LIGHT SOURCE DEVICE INCLUDING A PLANAR LIGHT SOURCE HAVING A SINGLE, SUBSTANTIALLY CONTINUOUS LIGHT EMISSION AREA AND DISPLAY DEVICE INCORPORATING THE LIGHT SOURCE DEVICE

(75) Inventors: Osamu Yokoyama, Shiojiri (JP); Tatsuya Shimoda, Suwa-gun (JP); Satoru Miyashita, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/072,919

(22) Filed: Mar. 7, 2005

(65) Prior Publication Data

US 2005/0146652 A1    Jul. 7, 2005

Related U.S. Application Data

(63) Continuation of application No. 09/485,153, filed as application No. PCT/JP99/03011 on Jun. 4, 1999, now Pat. No. 6,882,379.

(30) Foreign Application Priority Data

Jun. 5, 1998   (JP)   ................................. 10-157621

(51) Int. Cl.
   *G02F 1/1335*   (2006.01)
   *G03B 21/14*   (2006.01)
(52) U.S. Cl. .............................. 349/61; 349/5; 349/68; 349/70; 349/98; 353/20
(58) Field of Classification Search ................. 349/61, 349/62, 68, 70, 5, 6, 9, 98; 353/20
See application file for complete search history.

(56) References Cited

U.S. PATENT DOCUMENTS

| | | | |
|---|---|---|---|
| 4,793,691 A | 12/1988 | Enomoto et al. | 349/106 |
| 4,870,268 A | 9/1989 | Vincent et al. | 359/634 |
| 5,359,345 A | 10/1994 | Hunter | 345/102 |
| 5,438,453 A | 8/1995 | Kuga | 359/636 |
| 5,561,538 A | 10/1996 | Kato et al. | 349/5 |
| 5,661,608 A | 8/1997 | Barbier et al. | 315/10 |
| 5,706,061 A | 1/1998 | Marshall et al. | 348/743 |
| 5,757,445 A | 5/1998 | Vu et al. | 349/45 |
| 5,828,488 A | 10/1998 | Ouderkirk et al. | 349/62 |
| 5,973,833 A | 10/1999 | Booth et al. | 349/62 |
| 6,002,458 A | 12/1999 | Kaneko et al. | 349/5 |
| 6,011,602 A | 1/2000 | Miyashita et al. | 349/61 |
| 6,020,866 A | 2/2000 | Yamaguchi | 349/20 |

(Continued)

FOREIGN PATENT DOCUMENTS

EP   0 808 071 A1   11/1997

(Continued)

*Primary Examiner*—Tarifur R. Chowdhury
(74) *Attorney, Agent, or Firm*—Oliff & Berridge, PLC

(57) ABSTRACT

A red light source comprising an array of LEDs 102R that emit light of a red color, a green light source comprising an array of LEDs 102G that emit light of a green color, and a blue light source comprising an array of LEDs 102B that emit light of a blue color are deployed about the periphery of a dichroic prism 101. A liquid crystal display element is illuminated by a light source device configured such that the light from the respective light sources is synthesized into white light by the dichroic prism, and projection type liquid crystal display devices and the like are configured.

20 Claims, 14 Drawing Sheets

U.S. PATENT DOCUMENTS

| | | | |
|---|---|---|---|
| 6,069,676 A | 5/2000 | Yuyama | 349/62 |
| 6,176,586 B1 | 1/2001 | Hirose et al. | 349/9 |
| 6,336,724 B1 | 1/2002 | Shouji et al. | 353/20 |
| 6,543,900 B1 * | 4/2003 | Noji et al. | 353/94 |
| 2002/0154404 A1 | 10/2002 | Sedlmayr | 349/5 |

FOREIGN PATENT DOCUMENTS

| | | |
|---|---|---|
| JP | A-10-33129 | 12/1989 |
| JP | A-5-13049 | 1/1993 |
| JP | A-5-313128 | 11/1993 |
| JP | A 6-260149 | 9/1994 |
| JP | A 6-508449 | 9/1994 |
| JP | 07-64079 | 3/1995 |
| JP | A-7-128613 | 5/1995 |
| JP | A-7-281178 | 10/1995 |
| JP | WO 95/27919 | 10/1995 |
| JP | A-8-140107 | 5/1996 |
| JP | A-8-159813 | 6/1996 |
| JP | A-8-201757 | 8/1996 |
| JP | A-9-105929 | 4/1997 |
| JP | A-9-146092 | 6/1997 |
| JP | A-9-180883 | 7/1997 |
| JP | A 9-511844 | 11/1997 |
| JP | A-10-50124 | 2/1998 |
| JP | A-10-123512 | 5/1998 |
| JP | 10-2069802 | 10/1998 |
| JP | A-10-288780 | 10/1998 |
| JP | 10-326080 | 12/1998 |
| JP | 2000-221499 | 8/2000 |
| WO | WO 92/22838 A1 | 12/1992 |
| WO | WO 95/27917 A1 | 10/1995 |
| WO | WO 97/12276 | 4/1997 |
| WO | WO 97/43686 | 11/1997 |
| WO | WO-9813725 A1 | 4/1998 |
| WO | WO 98/20475 | 5/1998 |

* cited by examiner

LIGHT SOURCE DEVICE INCLUDING A PLANAR LIGHT SOURCE HAVING A SINGLE, SUBSTANTIALLY CONTINUOUS LIGHT EMISSION AREA AND DISPLAY DEVICE INCORPORATING THE LIGHT SOURCE DEVICE

This is a Continuation of application Ser. No. 09/485,153 filed Feb. 4, 2000, now U.S. Pat. No. 6,882,379 which is the U.S. National Stage of PCT Application No. PCT/JP99/03011. The entire disclosure of the prior application is hereby incorporated by reference herein in its entirety.

TECHNICAL FIELD

The present invention relates to the configuration of a light source device in a display device for the magnification and projection of images displayed in liquid crystal display elements, and to the configuration of a display device using that light source device.

BACKGROUND ART

The technology disclosed in, as published, may be cited as first prior art for miniaturizing projection type liquid crystal display devices which magnify, project, and display images of liquid crystal display elements.

Disclosed in this publication is the configuration of a display device wherein three liquid crystal display elements are deployed about the periphery of a dichroic prism, the liquid crystal display elements are illuminated by flat-panel fluorescent tubes emitting different colors of light, respectively, deployed on the back sides of the liquid crystal display elements, and images of the several colors synthesized by the dichroic prism are projected on a screen by a projection lens.

As second prior art for miniaturizing projection type liquid crystal display devices, a configuration may be cited wherein only one liquid crystal display element is used, that liquid crystal display element is illuminated from the back side thereof by a lamp such as a metal halide lamp, and the image of the liquid crystal display element is projected onto a screen by a projection lens.

With the first prior art, cited above, however, because three liquid crystal display elements are used, costs becomes high, which is a problem, and an adjustment mechanism become necessary for keeping the images of the three liquid crystal display elements from shifting out of place, which makes it very difficult to realize further miniaturization in the display devices, which is also a problem.

With the second prior art, cited above, moreover, the light source is a white light source, making it necessary to have color filters in the pixels of the liquid crystal display element in order to project color images. Three pixels, namely a red, a green, and a blue pixel are necessary in order to generate colors, whereupon display image resolution deteriorates, and, since light other than that of the transmission wavelength is absorbed by the color filters, the display images become dark, which is a problem. In addition, a high voltage is required for lighting the metal halide lamp, which means that the power supply circuit becomes large, thus making it very difficult to miniaturize the display device, which is a problem.

DISCLOSURE OF THE INVENTION

With the foregoing in view it is an object of the present invention to use only one liquid crystal display element, in order to miniaturize the display device, and to miniaturize the overall display device by making the light source device compact.

It is a further object to provide, even in a display device using a single liquid crystal display element, a display device wherein the light from the light source device is used with high efficiency, and which is capable of displaying images of high resolution.

The light source device cited in claim 1 comprises a first light source for emitting light of a first color, a second light source for emitting light of a second color, and a third light source for emitting light of a third color, characterized in that the light from the first light source, the light from the second light source, and the light from the third light source are synthesized by a color synthesizing optical system.

According to the configuration described above, there is a benefit in that, because light from light emitting elements exhibiting high light emission efficiency in the several colors can be synthesized, a white light source that is small and bright can be configured.

The light source device cited in claim 2 is the light source device cited in claim 1, characterized in that the first color is a color in the region from orange to red, the second color is a color in the region from green to yellow-green, and the third color is a color in the blue region.

According to the configuration described above, there is a benefit in that, because light from light emitting elements exhibiting high light emission efficiency in the several colors can be synthesized, a white light source that is small and bright can be configured.

The light source device cited in claim 3 is the light source device cited in claim 1 or claim 2, characterized in that the color synthesizing optical system is a dichroic prism.

With a dichroic prism, it is possible to make the optical axes of the three colors coincide in a condition wherein there is almost no light quantity loss.

The light source device cited in claim 4 is the light source device cited in any one of claims 1 to 3, characterized in that the first, second, and third light sources are light emitting diodes.

According to the configuration described above, there is a benefit in that, because the light source can be lit with a low voltage DC power supply of 3 V or so, a small white light source can be configured that includes the power supply as well.

The light source device cited in claim 5 is the light source device cited in claim 4, characterized in that a plurality of the light emitting diodes are deployed two-dimensionally in the first, second, and third light sources, respectively.

According to the configuration described above, there is a benefit in that a small white light source can be configured which emits light in a planar form.

The light source device cited in claim 6 is the light source device cited in claim 5, characterized in that lenses are deployed between the first, second, and third light sources and the color synthesizing optical system.

According to the configuration described above, there is a benefit in that the light emitted from the light emitting diodes can be converted to light of high parallelism, and a small white light source can be configured wherewith the light is of high parallelism.

The light source device cited in claim 7 is the light source device cited in claim 5, characterized in that lens array elements are deployed between the first, second, and third light sources and the color synthesizing optical system.

According to the configuration described above, there is a benefit in that the light emitted from the plurality of light emitting diodes can be converted to light of high parallelism, and a small white light source can be configured wherewith the light is of high parallelism.

The light source device cited in claim 8 is the light source device cited in any one of claims 1 to 3, characterized in that each of the first, second, and third light sources is a planar light source.

By planar light source, here, is meant a light source having a single, substantially continuous light emission region, capable of emitting light with a uniform light emission quantity over a displayed area having vertical and lateral extent, wherewith light quantity irregularity can be prevented.

The light source device cited in claim 9 is the light source device cited in any one of claims 1 to 3, characterized in that the first, second, and third light sources are flat-panel fluorescent tubes.

According to the configuration described above, there is a benefit in that, because light from light emitting elements exhibiting high light emission efficiency in the several colors can be synthesized, a white light source that is small and bright can be configured.

Also, because thin fluorescent tubes that emit light in planar form can be used, the light source device can be miniaturized.

The light source device cited in claim 10 is the light source device cited in claim 9, characterized in that prism array elements are deployed between the flat-panel fluorescent tubes and the color synthesizing optical system.

According to the configuration described above, there is a benefit in that brightness can be enhanced in the frontal direction, and a light source device can be configured which is bright in the frontal direction.

The light source device cited in claim 11 is the light source device cited in claim 9, characterized in that the prism array elements are configured from two mutually perpendicular prism arrays.

According to the configuration described above, there is a benefit in that brightness can be enhanced in the frontal direction, and a light source device can be configured which is bright in the frontal direction.

The light source device cited in claim 12 is the light source device cited in claim 9, characterized in that a first polarization converter element is deployed between the first light source and the color synthesizing optical system, a second polarization converter element is deployed between the second light source and the color synthesizing optical system, and a third polarization converter element is deployed between the third light source and the color synthesizing optical system.

By causing the directions of light polarization to coincide, light quantity loss can be reduced when light output from the light source device passes through an optical material exhibiting polarization dependency in its optical characteristics.

The light source device cited in claim 13 is the light source device cited in claim 12, characterized in that the polarization converter elements are reflecting polarizing plates.

Due to the reflecting polarizing plates, polarized light that is oscillating in a desirable direction is transmitted, while polarized light [oscillating in a direction] perpendicular thereto is returned to the light source side. When scattering occurs inside the light source, the direction of polarization changes, but it becomes possible to transmit polarized light converted so that it oscillates in a desirable direction through the reflecting polarizing plates. By repeating the reflection and scattering between the reflecting polarizing plates and the light source in this manner, light emitted from the light source that is not polarized is converted by the reflecting polarizing plates to polarized light wherewith the directions of oscillation are aligned in the transmission axis directions of the reflecting polarizing plates.

The light source device cited in claim 14 is the light source device cited in any one of claims 1 to 3, characterized in that the first, second, and third light sources are flat-panel electroluminescent elements.

According to the configuration described above, there is a benefit in that, because thin planar-light emitting elements can be used, the light source device can be miniaturized.

The light source device cited in claim 15 is the light source device cited in claim 14, characterized in that the electroluminescent elements are organic electroluminescent elements wherein the light emitting layer is an organic thin film.

According to the configuration described above, there is a benefit in that, because the light source can be lit with a DC power supply, a small white light source can be configured that includes the power supply as well.

The light source device cited in claim 16 is the light source device cited in claim 14, characterized in that the organic electroluminescent elements comprise optical resonators in their light emitting layer structure.

According to the configuration described above, due to the optical resonator structure, the spectrum width of the light emitted from the organic electroluminescent elements can be narrowed to enhance color purity, and brightness in the normal direction (frontal direction) of the organic electroluminescent elements can also be enhanced.

The light source device cited in claim 17 is the light source device cited in claims 14 to 16, characterized in that a first polarization converter element is deployed between the first light source and the color synthesizing optical system, a second polarization converter element is deployed between the second light source and the color synthesizing optical system, and a third polarization converter element is deployed between the third light source and the color synthesizing optical system.

The direction of polarization in the light emitted from a plurality of light sources can be aligned, wherefore light loss in the optical elements can be reduced by employing light modulating elements or other optical elements exhibiting polarization dependence in the optical characteristics thereof as the light sources.

The light source device cited in claim 18 is the light source device cited in claim 17, characterized in that the polarization converter elements are configured of quarter-wave films and reflecting polarizing plates, the quarter-wave film is deployed on the light source side, and the reflecting polarizing plates are deployed on the color synthesizing optical system element side.

By giving the polarization converter elements a structure such as this, the oscillation direction of the light emitted by the polarization converter elements can be aligned in a specific direction by the reflection of the light between the polarization converter elements and the electroluminescent elements that are light sources provided with a mirror-surface reflecting structure.

The light source device cited in claim 19 is the light source device cited in any one of claims 1 to 18, characterized in that the first, second, and third light sources light simultaneously.

According to the configuration described above, there is a benefit in that the light emitted from the light source device can be made white.

The light source device cited in claim 20 is the light source device cited in any one of claims 1 to 18, characterized in that the first, second, and third light sources repeatedly light in succession.

According to the configuration described above, there is a benefit in that utilization is possible as a light source device in a sequential (or successive) color display type of display device.

A display device cited in claim 21 has a light modulating element and the light source device cited in any one of claims 1 to 20, characterized in that light from the light source device is modulated in the light modulating element, and the modulated light is magnified by a projection lens and displayed.

According to the configuration described above, there is a benefit in that a small projection type liquid crystal display device can be configured.

The invention cited in claim 22 is the display device cited in claim 21, characterized in that the light modulating element is a transmissive type liquid crystal element, the light source device is deployed opposite one face of the liquid crystal element, and images formed in the liquid crystal element are magnified by the projection lens and displayed.

Because this is a liquid crystal element, high-resolution images can be displayed, and images can be obtained with adequate brightness even when magnified and displayed by the projection lens.

The display device cited in claim 23 is the display device cited in claim 22, characterized in that a magnified virtual image of the image displayed by the liquid crystal display element is viewed.

According to the configuration described above, there is a benefit in that a virtual image viewing type of liquid crystal display device such as a small head-mounted display can be configured.

The display device cited in claim 24 is the display device cited in claim 22, characterized in that color filters are formed in the pixels configuring the liquid crystal display element.

According to the configuration described above, there is a benefit in that a small liquid crystal display device can be configured which is capable of color display.

The display device cited in claim 25 is the display device cited in claim 22, characterized in that the light modulating element is a reflecting type light modulating element, and the light source device is deployed opposite the reflecting surface of the light modulating element.

Because the light source device is deployed in opposition to the reflecting surface of the light modulating element, a compact image display device can be obtained.

The display device cited in claim 26 is a display device having a light modulating element and the light source device cited in any one of claims 1 to 20, wherein light from the light source device is modulated in the light modulating element, and the modulated light is magnified by a projection lens and displayed as an image; characterized in that the light modulating element forms, with time division, a first color component image, a second color component image, and a third color component image; the first light source in the light source device is lit during the time interval wherein the first color component image is being formed, the second light source in the light source device is lit next during the time interval wherein the second color component image is being formed, and the third light source in the light source device is lit next during the time interval wherein the third color component image is being formed; and a color image is displayed by the sequential display of the first, second, and third color components in the light modulating element, and by sequentially lighting of the first, second, and third light sources corresponding to those sequential displays.

According to the configuration described above, color display is possible, and a small projection type liquid crystal display device can be configured wherein the display images are bright.

Also, a small virtual image viewing type liquid crystal display device can be configured which is capable of color display and wherein the display images are bright.

The display device cited in claim 27 is the display device cited in claim 26, characterized in that the light modulating element is a transmissive liquid crystal element, the light source device is deployed opposite one face of the liquid crystal element, and images formed by the liquid crystal element are magnified and displayed by the projection lens.

The formation of images by the liquid crystal element results in high resolution, wherefore clear or fine images can be obtained even when they are magnified and projected.

The display device cited in claim 28 is the display device cited in claim 26, characterized in that virtual images that are magnifications of the images formed by the liquid crystal element are viewed.

By reducing light quantity loss and forming high-resolution images, clear or fine images can be obtained.

BEST MODE FOR CARRYING OUT THE INVENTION

Light source devices and display devices comprising those light source devices in suitable embodiments of the present invention are now described with reference to the attached drawings.

First Embodiment of Light Source Device

Figure 1A:
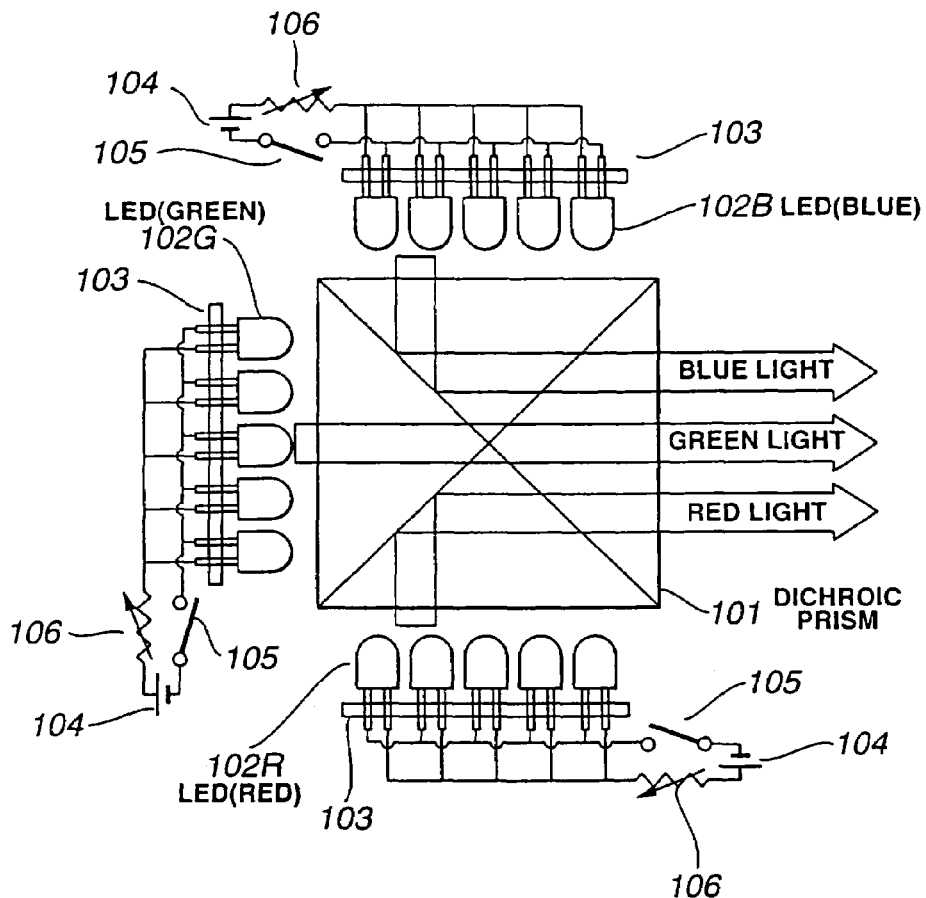
FIG. 1 is a diagram describing an optical system in a first embodiment of the light source device of the present invention, FIG. 1(a) being a view of the light source device as seen from above, and FIG. 1(b) being a plan looking at a red light source from the dichroic prism side.
Figure 1B:
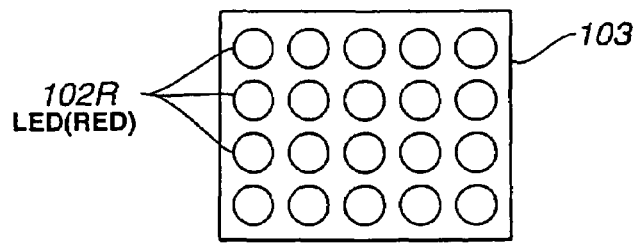

A first embodiment of the light source device of the present invention is described on the basis of FIG. 1. FIG. 1(*a*) is a diagram of the light source device as seen from above; FIG. 1(*b*) is a plan of a red light source as seen from the side of a dichroic prism serving as a color synthesizing optical system.

About the periphery of a dichroic prism 101 are deployed a red light source, a green light source, and a blue light source that are configured from two-dimensional arrays of light emitting diodes (LEDs).

The red light source is a structure wherein LEDs 102R (red) that emit light of a wavelength in the red region are fixed to a board 103. Electric power is supplied to the LEDs 102R (red) from a DC power supply 104 via a switch 105 and a variable resistor 106.

LEDs having a peak light emission wavelength of 620 nm can be used for the LEDs 102R (red). In that case, the color of the emitted light will appear to be orange, but it is assumed that the color orange contains the color red.

The red light source in this embodiment, as diagrammed in FIG. 1(*b*), is configured of an array of a total of 20 LEDs, 5 across and 4 down. The LEDs are of a shape formed by molding a transparent resin, the tips whereof have a lens shape, and the diameters whereof are 5 mm or so. The number of LEDs depends on the size of the light source needed, and in some applications may be 1.

The green light source is a structure wherein LEDs 102G (green) that emit light of a wavelength in the green region are fixed to a board 103. Electric power is supplied to the LEDs 102G (green) from a DC power supply 104 via a switch 105 and a variable resistor 106. The number of these LEDs is the same as for the red light source diagrammed in FIG. 1(*b*), namely 5 across and 4 down for a total of 20 LEDs.

LEDs having a peak light emission wavelength of 555 nm can be used for the LEDs 102G (green). In addition, it is assumed that emitted light that appears yellow-green also contains the green color.

The blue light source is a structure wherein LEDs 102B (blue) that emit light of a wavelength in the blue region are fixed to a board 103. Electric power is supplied to the LEDs 102B (blue) from a DC power supply 104 via a switch 105 and a variable resistor 106. The number of these LEDs is the same as for the red light source diagrammed in FIG. 1(*b*), namely 5 across and 4 down for a total of 20 LEDs.

LEDs having a peak light emission wavelength of 470 nm can be used for the LEDs 102B (blue).

The light leaving the red light source is reflected by the red reflecting mirror of the dichroic prism 101. The light leaving the blue light source is reflected by the blue reflecting mirror of the dichroic prism 101. And the light leaving the green light source is transmitted through the dichroic prism 101. In this manner, in the dichroic prism 101, red, green, and blue light from the faces where no light source is deployed is synthesized and output.

By controlling the current supplied to the LEDs of the various colors, the color of the light synthesized by the dichroic prism 101 can be made white, and hence a white light source can be configured. And by selecting the light source that is lit by the switches 105, light can be emitted in the single colors of red, green, and blue, and hence a single-color light source device can be effected.

It is also possible to select two light sources to be lit, by the switches 105, and thus to synthesize any two colors among red, green, and blue.

Second Embodiment of Light Source Device

A second embodiment of the light source device of the present invention is described on the basis of FIG. 2. FIG. 2(*a*) is a diagram of the light source device as seen from above; FIG. 2(*b*) is a plan of a red light source as seen from the dichroic prism side.

In FIG. 2(*b*), the LEDs 102R (red) corresponding to lens elements 202R configuring a lens array 201R are described by dotted lines. In FIG. 2(*a*), moreover, the electrical circuitry for the light source, such as is diagrammed in FIG. 1(*a*), is not shown.

About the periphery of the dichroic prism 101 are deployed a red light source, green light source, and blue light source that are configured of two-dimensional arrays of light emitting diodes (LEDs).

The red light source is configured of an array of LEDs 102R (red) that emit light of a wavelength in the red region, and a lens array 201R deployed between these LEDs and the dichroic prism. The lens array 201R is configured by an array of lens elements 202R. The aperture shape in the lens elements 202R is rectangular.

One lens element 202R corresponds with one LED 102R (red), and functions to collimate divergent light that is emitted from the LED and to input light exhibiting high parallelism to the dichroic prism. The lens elements 202R in the red light source are designed so that there will be little aberration at the peak light emission wavelength of the LEDs 102R (red). In addition, an anti-reflective film is formed [thereon] so that reflection at the surface is minimized at that wavelength.

The green light source is configured of an array of LEDs 102G (green) that emit light of a wavelength in the green region, and a lens array 201G deployed between these LEDs and the dichroic prism. The lens array 201G is configured by an array of lens elements (not shown) as in the case of the red light source diagrammed in FIG. 2(*b*).

The lens elements in the green light source are designed so that there will be little aberration at the peak light emission wavelength of the LEDs 102G (green). In addition, an anti-reflective film is formed [thereon] so that reflection at the surface is minimized at that wavelength.

The blue light source is configured of an array of LEDs 102B (blue) that emit light of a wavelength in the blue region, and a lens array 201B deployed between these LEDs and the dichroic prism. The lens array 201B is configured by an array of lens elements (not shown) as in the case of the red light source diagrammed in FIG. 2(b).

The lens elements in the blue light source are designed so that there will be little aberration at the peak light emission wavelength of the LEDs 102B (blue). In addition, an anti-reflective film is formed [thereon] so that reflection at the surface is minimized at that wavelength.

In the light source device of this embodiment, the divergent light emitted from the LEDs of the various colors is converted by the lens arrays to light exhibiting high parallelism and input to the dichroic prism, wherefore the light synthesized by the dichroic prism exhibits high parallelism, and a light source device can be provided wherewith the emitted light exhibits high parallelism.

Figure 2A:
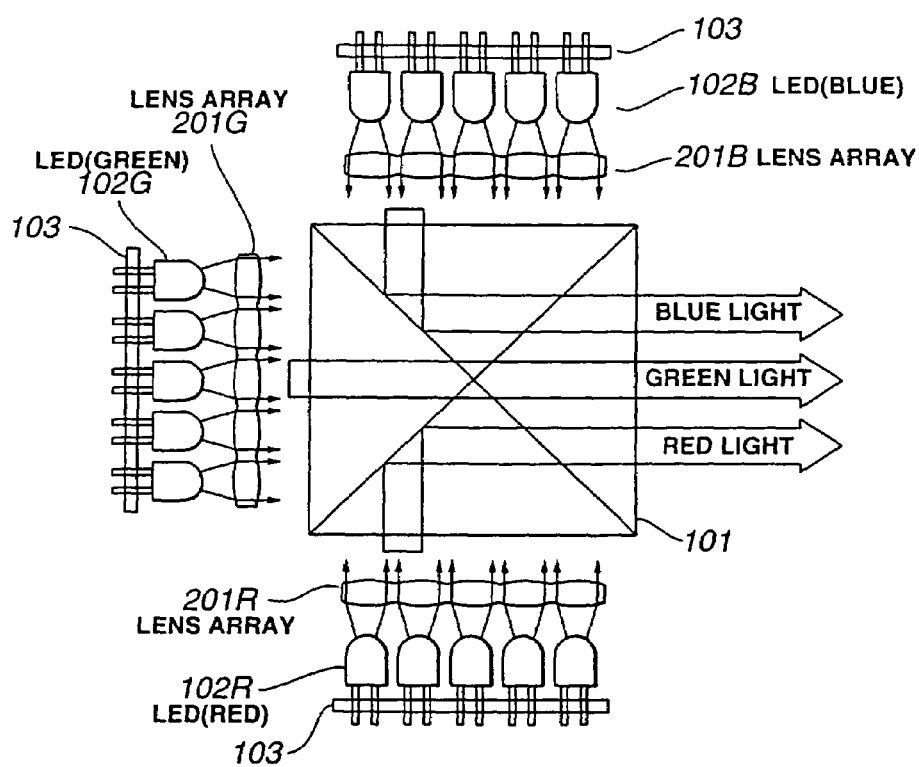
FIG. 2 is a diagram describing an optical system in a second embodiment of the light source device of the present invention, FIG. 2(a) being a view of the light source device as seen from above, and FIG. 2(b) being a plan looking at a red light source from the dichroic prism side.
Figure 2B:
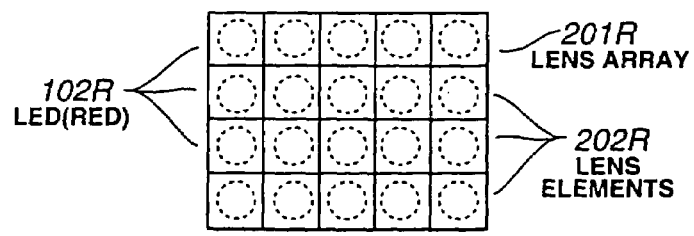

In FIG. 2(a), the shapes of the LEDs are represented as shapes formed by molding a transparent resin so that the tips thereof are lens shaped, but such a lens shape is not always necessary.

Third Embodiment of Light Source Device

Figure 3:
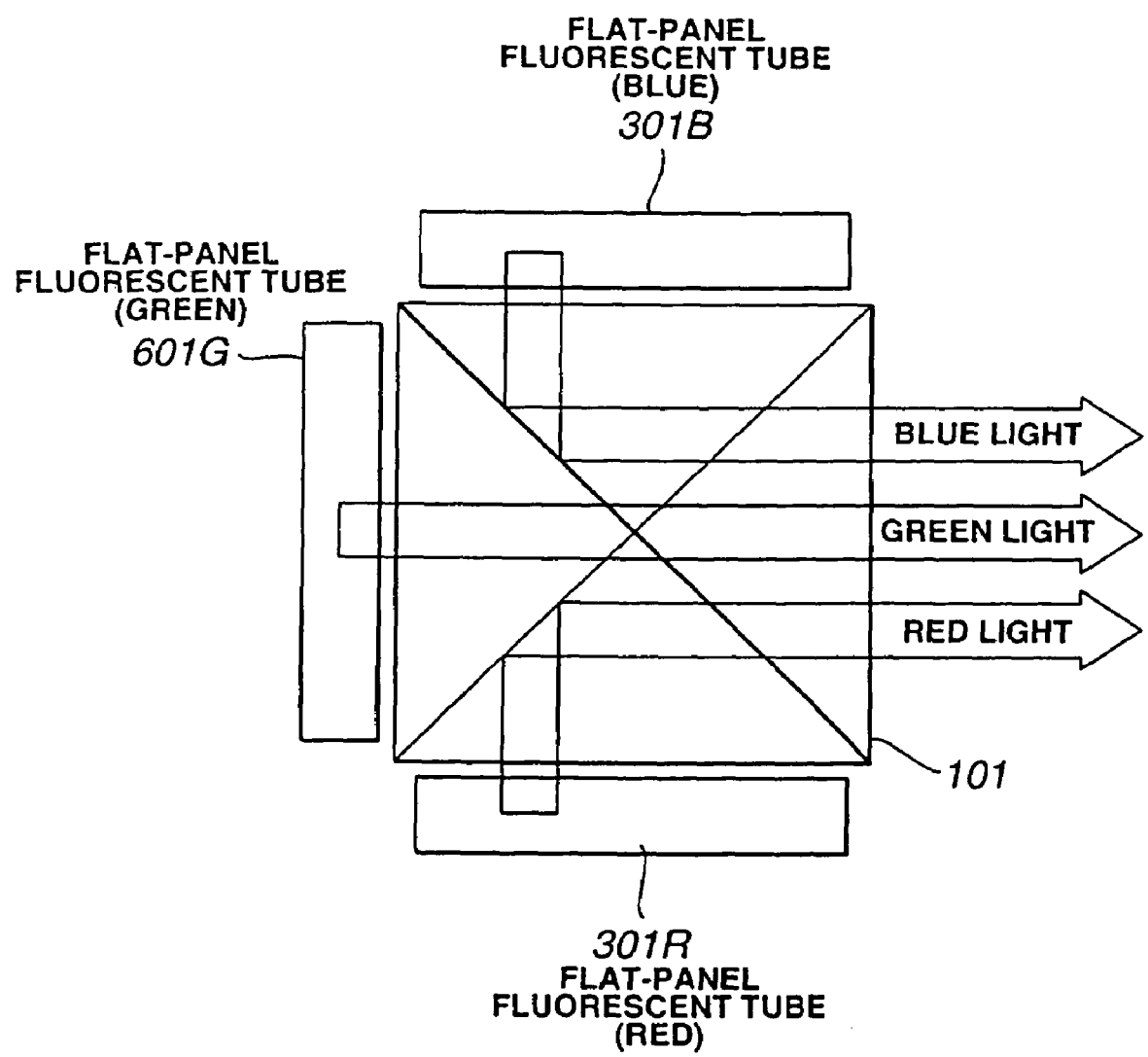
FIG. 3 is a diagram describing an optical system in a third embodiment of the light source device of the present invention looking at the light source device from above.

A third embodiment of the light source device of the present invention is described on the basis of FIG. 3. FIG. 3 is a diagram of the light source device as seen from above.

About the periphery of a dichroic prism 101 are deployed a flat-panel fluorescent tube 301R (red) emitting light of a wavelength in the red region, a flat-panel fluorescent tube 301G (green) emitting light of a wavelength in the green region, and a flat-panel fluorescent tube 301B (blue) emitting light of a wavelength in the blue region.

These fluorescent tubes 301R, 301G, and 301B of the various colors comprise light emitting bodies that, respectively, are a fluorescent body that emits light which is red, a fluorescent body that emits light which is green, and a fluorescent body that emits light which is blue. Each of these fluorescent tubes has a planar size such that the light emission area is on the order of 19 mm×14 mm. The size of the fluorescent tubes is not limited to this size, and may be altered according to the size of the light source required.

By employing the flat-panel fluorescent tubes 301R, 301G, and 301B as light sources, moreover, light can be emitted uniformly over the prescribed surface area (based on a set value which is according to the size of the area that is to be illuminated in the illuminated body that is to be illuminated), and lens arrays or the like, such as are added when LEDs 102R, 102G, and 102B are used, as in the light source device in the second embodiment, become unnecessary. Hence outstanding benefits are realized with a simple structure.

Depending on the surface area, moreover, rod-shaped fluorescent tubes may be used, deploying such rod-shaped fluorescent tubes in parallel.

Fourth Embodiment of Light Source Device

Figure 4A:
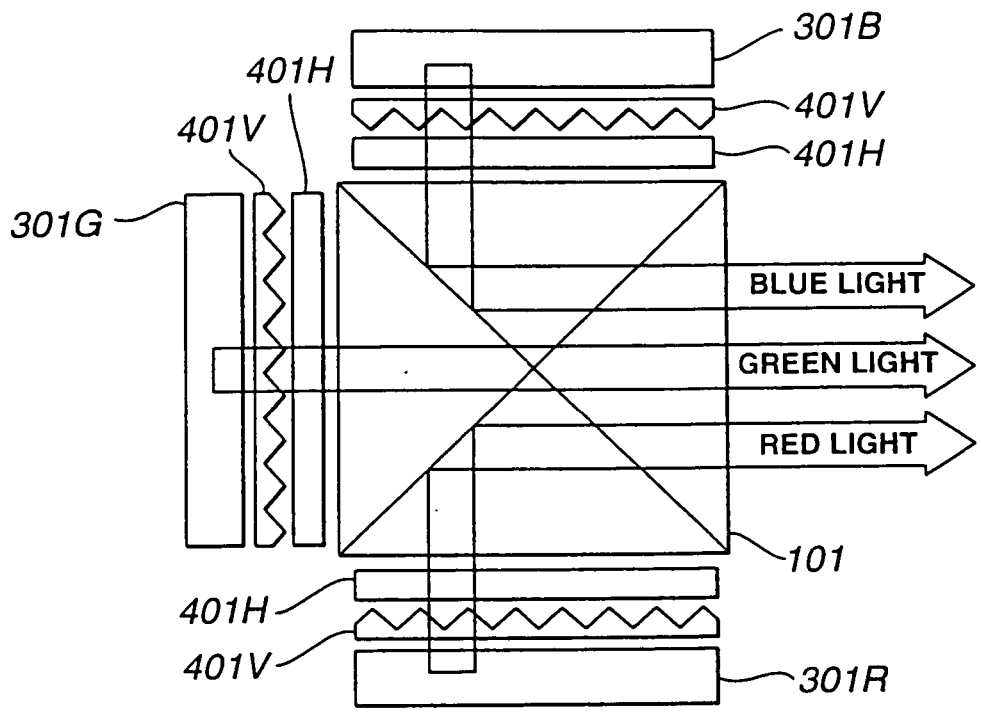
FIG. 4 is a diagram describing an optical system in a fourth embodiment of the light source device of the present invention, FIG. 4(a) being a view of the light source device as seen from above, and FIG. 4(b) being a diagonal view of the red light source.
Figure 4B:
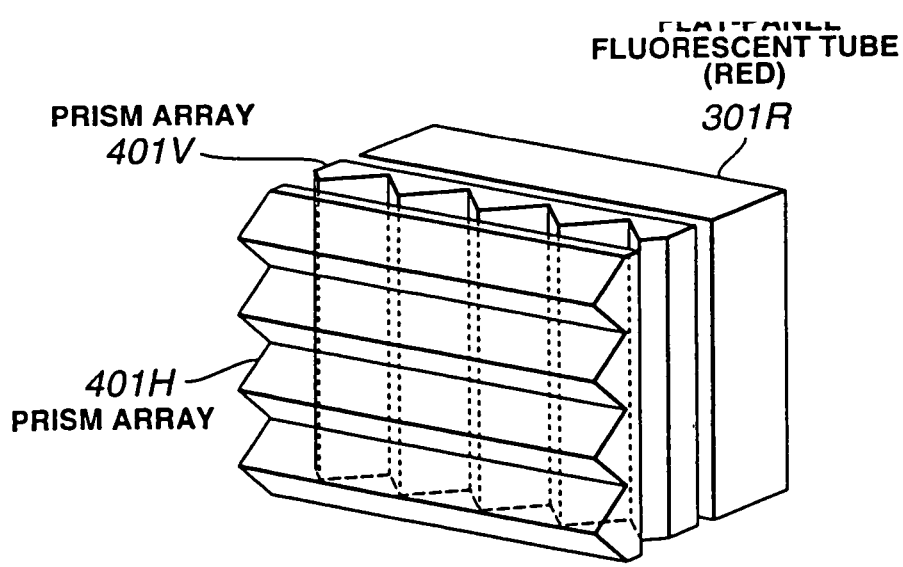

A fourth embodiment of the light source device of the present invention is described on the basis of FIG. 4. FIG. 4(a) is a diagram of the light source device as seen from above; FIG. 4(b) is a diagonal view of a red light source.

About the periphery of a dichroic prism 101 are deployed a flat-panel fluorescent tube 301R (red) emitting light of a wavelength in the red region, a flat-panel fluorescent tube 301G (green) emitting light of a wavelength in the green region, and a flat-panel fluorescent tube 301B (blue) emitting light of a wavelength in the blue region.

Between the dichroic prism and the light source of each respective color are inserted two prism arrays 401V and 401H. Each of these prism arrays is configured of rows of roof-shaped prisms extending in one direction. The prism array 401V and the prism array 401H are deployed so that the directions of the respective prisms are mutually perpendicular.

In the case of the light source device in the third embodiment, light leaving the flat-panel fluorescent tubes is input as divergent light to the dichroic prism. In this embodiment, however, by deploying the prism arrays in front of the fluorescent tubes, light can be gathered in the normal direction of the fluorescent tubes, and thus a light source device can be configured that exhibits high brightness in the frontal direction.

Furthermore, by deploying a reflective polarizing plate between the prism 401H and the dichroic prism corresponding to each color, the direction of polarization of the light emitted from the flat-panel fluorescent tubes 301R, 301G, and 301B can be aligned. Using such technology as this, the light emitted from the dichroic prism 101 can be made linearly polarized light wherein the direction of oscillation is aligned.

Fifth Embodiment of Light Source Device

Figure 5:
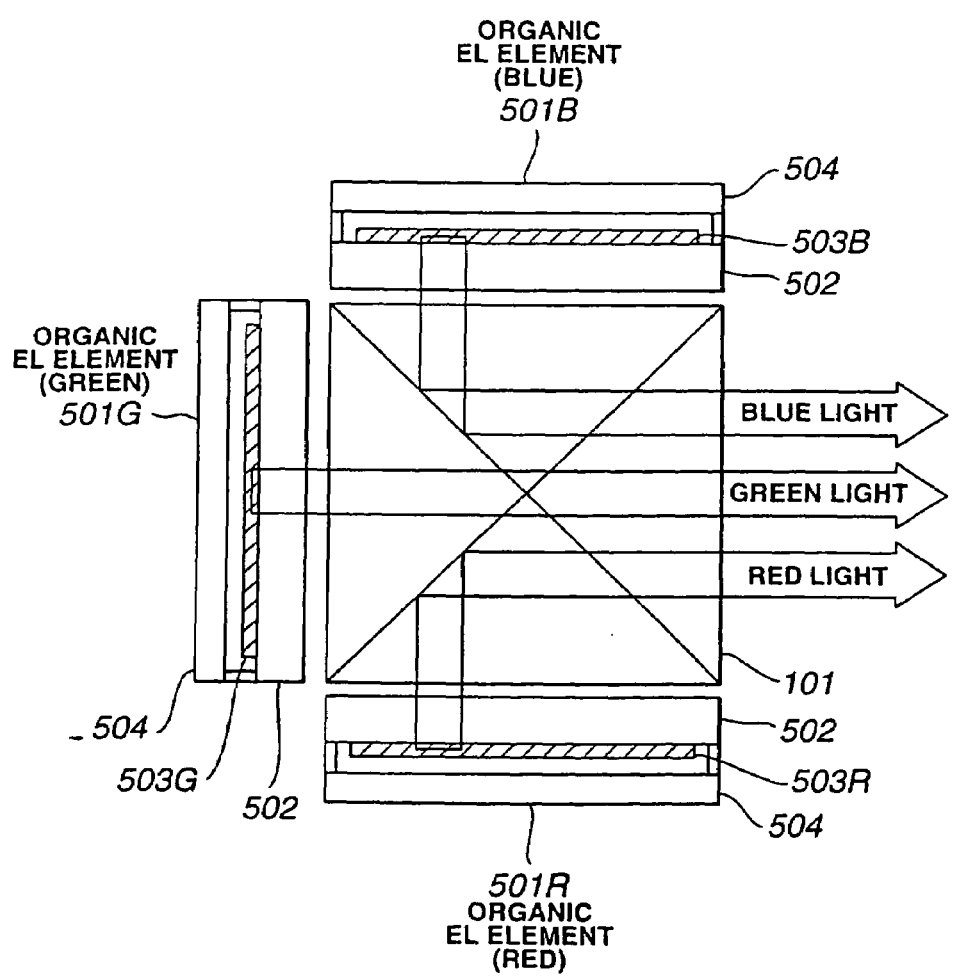
FIG. 5 is a diagram describing an optical system in a fifth embodiment of the light source device of the present invention looking at the light source device from above.

A fifth embodiment of the light source device of the present invention is described on the basis of FIG. 5. FIG. 5 is a diagram of the light source device as seen from above.

About the periphery of a dichroic prism 101 are deployed an organic electroluminescent element (EL) 501R (red) that emits light of a wavelength in the red region, an organic electroluminescent element (EL) 501G (green) that emits light of a wavelength in the green region, and an organic electroluminescent element (EL) 501B (blue) that emits light of a wavelength in the blue region.

Each of these organic electroluminescent elements 501R, 501G, and 501B, respectively, comprises a light emitting layer structure 503R, 503G, and 503B wherein are laminated, on a glass substrate 502, a transparent electrode, an organic thin film layer structure, and a metal electrode. The light emitting layer structures are sealed by a sealing substrate 504. The organic light emitting layers in the organic thin film layer structures emit light when acted on by a DC electric field applied between the transparent electrodes and the metal thin films. In terms of the materials for the organic light emitting films, it is possible to configure a red light source by using a material that emits light of a red color, a green light source by using a material that emits light of a green color, and a blue light source by using a material that emits light of a blue color.

The organic light emitting film for each color has a planar size such that the light emission area is on the order of 19 mm×14 mm. The size of the light emission area is not limited to this size, but may be altered according to the size of the light source required.

Thus, by employing the organic EL elements 501R, 501G, and 501B, a superiority is realized in that more uniform light emission can be effected over a certain surface area as compared to when the LEDs 102R, 102G, and 102B are employed as light sources as described earlier (in the light source device in the first embodiment, for example). These organic EL elements 501R, 501G, and 501B, moreover, are similar to the flat-panel fluorescent tubes 301R, 301G, and 301B employed in the light source device in the fourth embodiment described earlier, and are categorized as planar light sources having a single, substantially continuous light emission area.

Sixth Embodiment of Light Source Device

Figure 6:
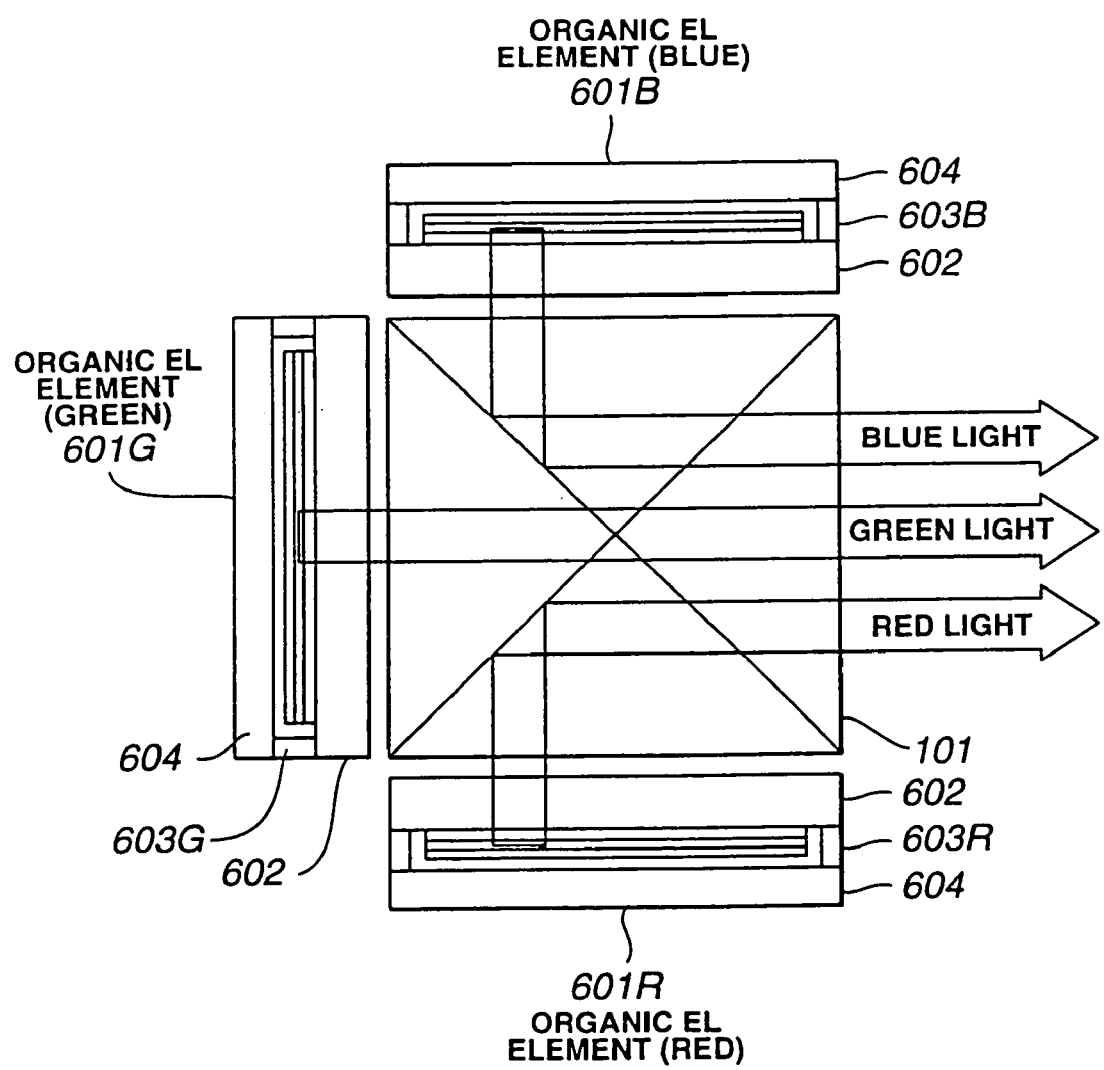
FIG. 6 is a diagram describing an optical system in a sixth embodiment of the light source device of the present invention looking at the light source device from above.

A sixth embodiment of the light source device of the present invention is described on the basis of FIG. 6. FIG. 6 is a diagram of the light source device as seen from above.

About the periphery of a dichroic prism 101 are deployed an organic electroluminescent element (EL) 601R (red) that emits light of a wavelength in the red region, an organic electroluminescent element (EL) 601G (green) that emits light of a wavelength in the green region, and an organic electroluminescent element (EL) 601B (blue) that emits light of a wavelength in the blue region.

Each of these organic electroluminescent elements 601R, 601G, and 601B, respectively, comprises a light emitting layer structure 603R, 603G, and 603B wherein are laminated, on a glass substrate 602, a transparent electrode, an organic thin film layer structure, and a metal electrode. The light emitting layer structures are sealed by a sealing substrate 604. The organic light emitting layers in the organic thin film layer structures emit light when acted on by a DC electric field applied between the transparent electrodes and the metal thin films. In terms of the materials for the organic light emitting films, it is possible to configure a red light source by using a material that emits light of a red color, a green light source by using a material that emits light of a green color, and a blue light source by using a material that emits light of a blue color.

The organic light emitting film for each color has a planar size such that the light emission area is on the order of 19 mm×14 mm. The size of the light emission area is not limited to this size, but may be altered according to the size of the light source required.

Thus the basic configuration in this embodiment is the same as that of the light source device diagrammed in FIG. 5 in the fifth embodiment. The organic thin film layer structure therein is different, however, in that, in this sixth embodiment, an optical resonator structure is comprised in the organic thin film layer structure. With the optical resonator structure, the spectrum width of the light emitted by the organic EL elements 601R, 601G, and 601B can be narrowed and the color purity thereof enhanced, while the brightness in the normal direction (frontal direction) of the organic EL elements can also be enhanced.

Seventh Embodiment of Light Source Device

Figure 7:
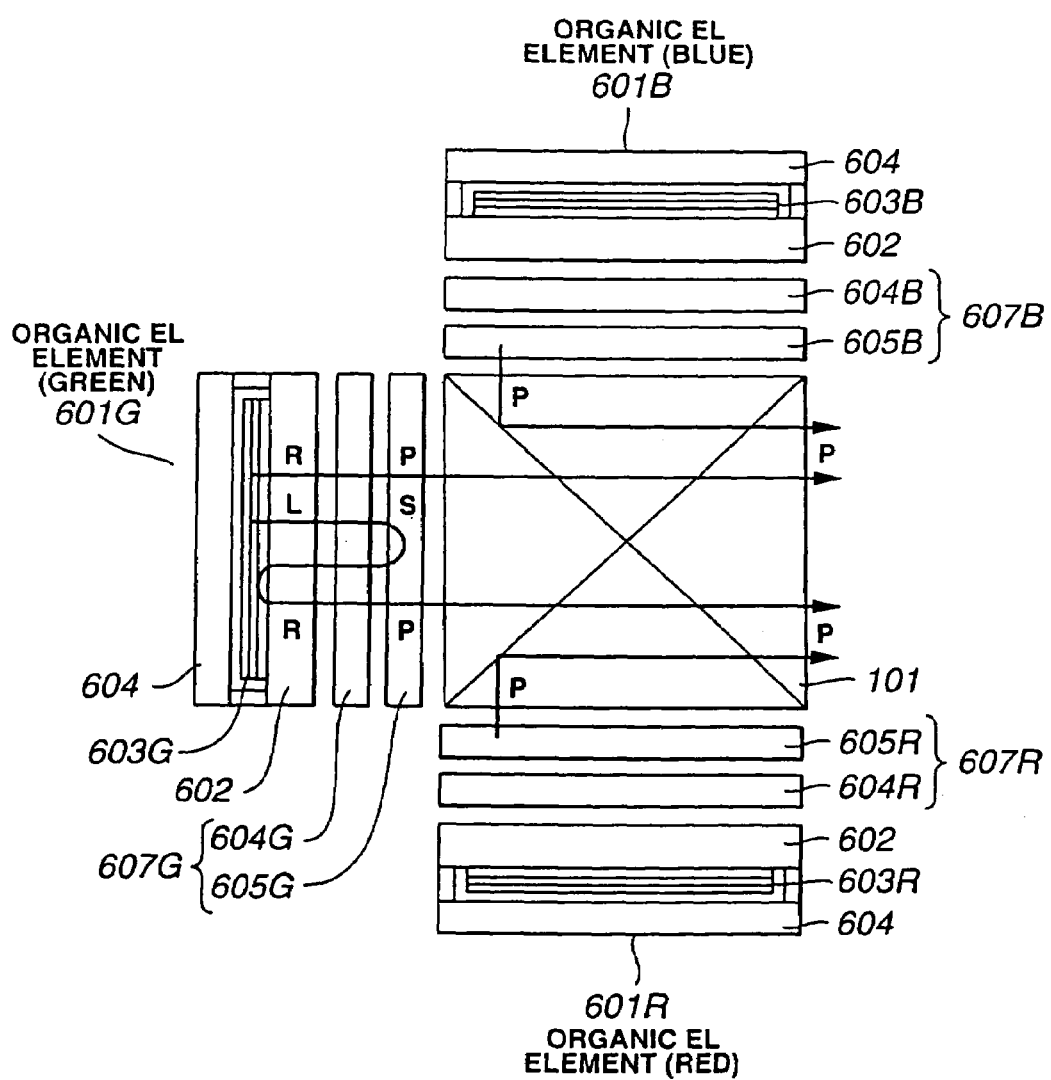
FIG. 7 is a diagram describing an optical system in a seventh embodiment of the light source device of the present invention looking at the light source device from above.

A seventh embodiment of the light source device of the present invention is described on the basis of FIG. 7. The same symbols are used here to designate the same configuring parts of the light source device as in the sixth embodiment.

The light sources employed in this seventh embodiment are planar light sources, specifically an organic EL element 601R that emits light of a red color, an organic EL element 601G that emits light of a green color, and an organic EL element 601B that emits light of a blue color. Each of these light emitting elements 601R, 601G, and 601B comprises an optical resonator structure as in the light source device in the sixth embodiment. The light from the light emitting elements 601R, 601G, and 601B of these three colors is synthesized by the dichroic prism 101. However, in the light source device in this seventh embodiment, polarization converter elements 607R, 607G, and 607B configured of quarter-wave films (¼λ plates) 604R, 604G, and 604B and reflecting polarizing plates 605R, 605G, and 605B are deployed between the dichroic prism 101 and the light emitting elements 601R, 601G, and 601B.

The quarter-wave film 604R and the reflecting polarizing plates .605R are deployed in front of the organic EL element 601R emitting light that is red, the quarter-wave film 604G and the reflecting polarizing plate 605G are deployed in front of the organic EL element 601G emitting light that is green, and the quarter-wave film 604B and the reflecting polarizing plate 605B are deployed in front of the organic EL element 601B emitting light that is blue. The reflecting polarizing plates 605R, 605G, and 605B, respectively, function to transmit linearly polarized light oscillating in a first direction, and to reflect linearly polarizing light oscillating in a second direction that is perpendicular to the first direction.

The functions of the polarization converter elements 607R, 607G, and 607B are now described, taking the organic EL element 601G that emits light of a green color as an example.

It is here assumed that right-handed circularly polarized light from the organic EL element 601G (indicated by R in the figure) is converted to p-polarized light (indicated by P in the figure) that is linearly polarized light by the quarter-wave film 604G. If it is further assumed that the reflecting polarizing plate 605G is able to transmit the p-polarized light P, then this p-polarized light P is transmitted through the reflecting polarizing plate 605G.

The left-handed circularly polarized light (indicated by L in the figure) from the organic EL element 601G, on the other hand, is converted by the quarter-wave film 604G to s-polarized light (indicated by S in the figure) that is linearly polarized light which is perpendicular to the p-polarized light. The s-polarized light is reflected by the reflecting polarizing plate 605G, converted back to left-handed circularly polarized light by the quarter-wave film 604G, and returned to the organic EL element 601G.

The left-handed circularly polarized light that is returned to the organic EL element 601G is converted to right-handed circularly polarized light when it is reflected by the cathode electrode of the organic EL element, etc., and then converted to p-polarized light by the quarter-wave film 604G. In this manner, the light emitted from the organic EL element 601G is converted to linearly polarized light, wherein the direction of polarization is aligned, by the polarization converter element 607G configured of the quarter-wave film 604G and the reflecting polarizing plate 605G.

The technology for converting the polarization of light emitted from such organic EL elements 601R, 601G, and 601B is disclosed in International Disclosure and International Disclosure.

The quarter-wave film 604G and the reflecting polarizing plate 605G, respectively, may also be elements that function only in the green wavelength band, or they may be elements that function across the visible light wavelength region that includes red, green, and blue.

The light emitted from the organic EL element 601R that emits light that is red and the organic EL element 601B that emits light that is blue, similarly, are converted to linearly polarized light P, wherein the direction of oscillation is aligned, by the polarization converter elements 607R and 607B.

The quarter-wave film 604R and the reflecting polarizing plate 605R corresponding to the red color, or the quarter-wave film 604B and the reflecting polarizing plate 605B corresponding to the blue color, may be elements that, respectively, function only in the red or blue wavelength bands, or they may be elements that function across the visible light wavelength region that includes red, green, and blue.

The red, green, and blue light that has become linearly polarized light is synthesized by the dichroic prism 101 and output from the dichroic prism 101 as linearly polarized light wherein the direction of oscillation is aligned.

First Embodiment of Display Device

Figure 8:
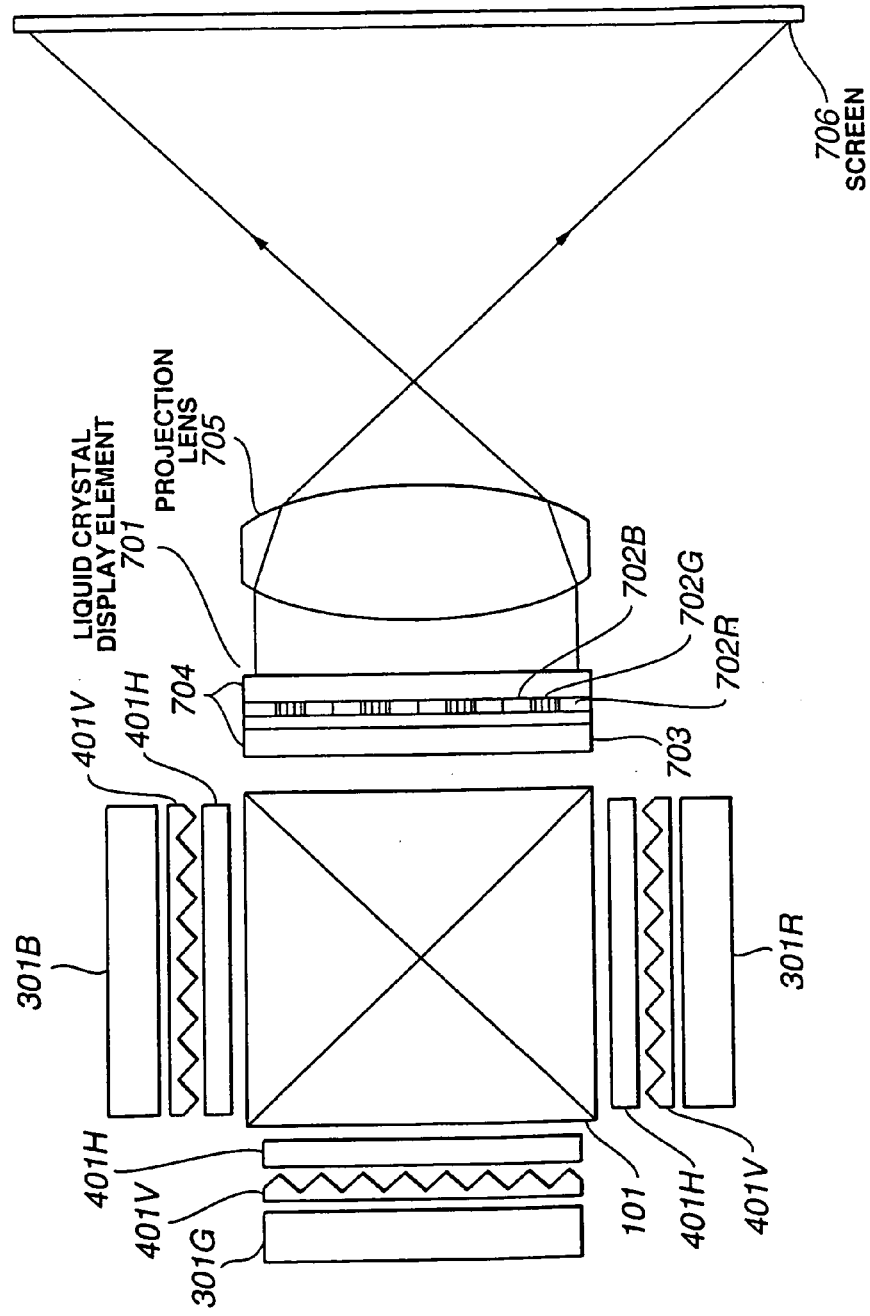
FIG. 8 is a diagram of the main optical system in a first embodiment of the display device in the present invention, as seen from above.

A first embodiment of the display device of the present invention is described on the basis of FIG. 8. FIG. 8 is a diagram of the main optical system of the display device, as seen from above.

On the back side of a liquid crystal display element 701 is deployed the light source device described in the fourth embodiment as the light source diagrammed in FIG. 4. The light source device is configured of a dichroic prism 101, flat-panel fluorescent tube 301R (red), flat-panel fluorescent tube 301G (green), flat-panel fluorescent tube 301B (blue), and prism arrays 401V and 401H. White light resulting from the synthesis of red, green, and blue colors is directed onto the liquid crystal display element 701.

The image displayed on the liquid crystal display element 701 is magnified and projected onto a screen 706 by a projection lens 705.

The liquid crystal display element 101 has a liquid crystal layer 703 that is sandwiched between glass substrates 704, whereon are formed color filters 702R, 702G, and 702B, in each pixel, for displaying color images. To make it easier to understand, this diagram is drawn without showing the wiring or elements that drive the liquid crystal.

The display area on the liquid crystal display element 701 is 18.3×13.7 mm (0.9 inch diagonally), for example. The size of this display area can be altered as necessary, but the sizes of the light emission areas of the light sources for each color must also be altered to match the size of the display area.

In the light source devices of each color which employ flat-panel fluorescent tubes as described for the light source device in the fourth embodiment, reflecting polarizing plates may be deployed between the dichroic prism and the prism arrays.

Second Embodiment of display Device

Figure 9:
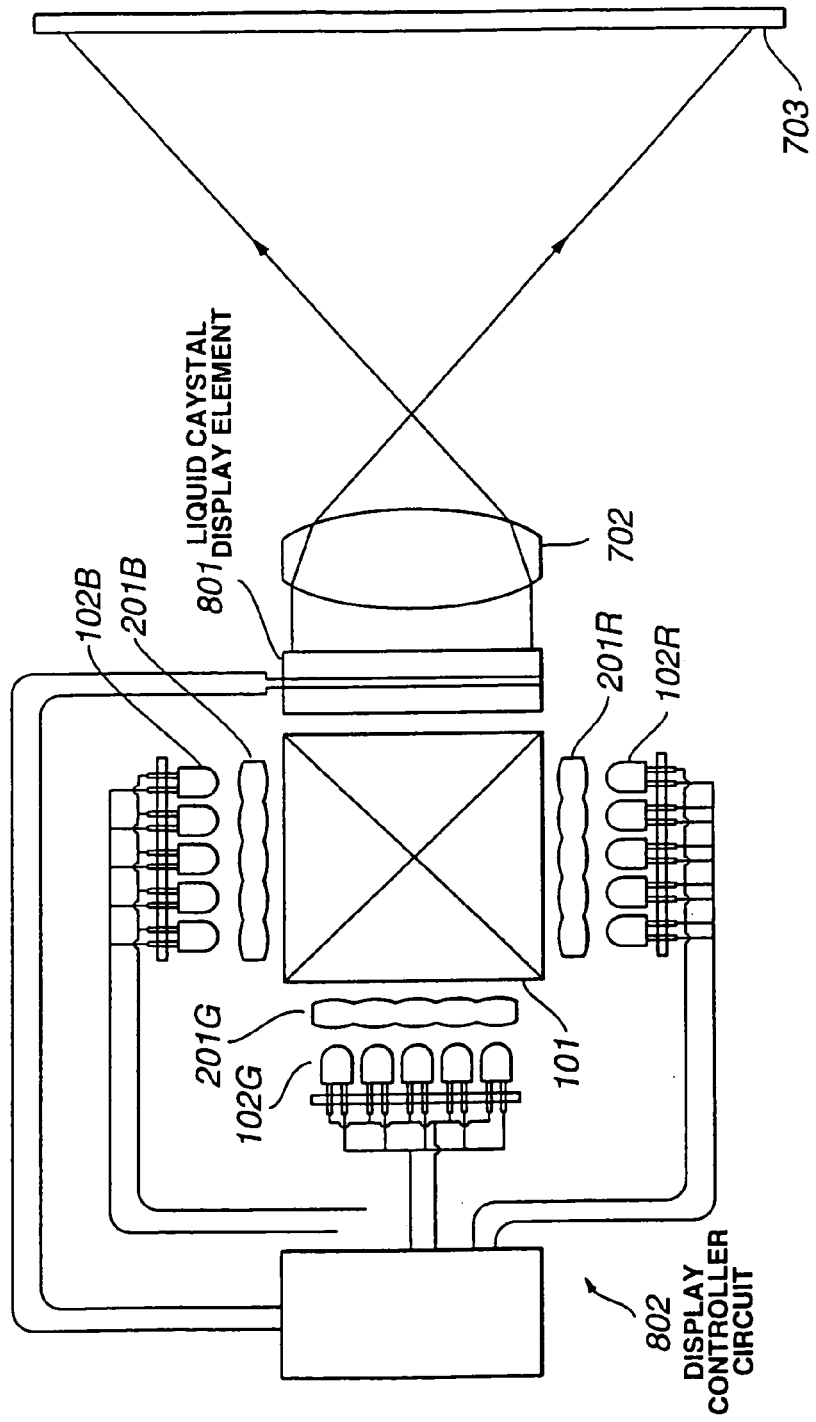
FIG. 9 is a diagram of the main optical system in a second embodiment of the display device in the present invention, as seen from above.
Figure 10:
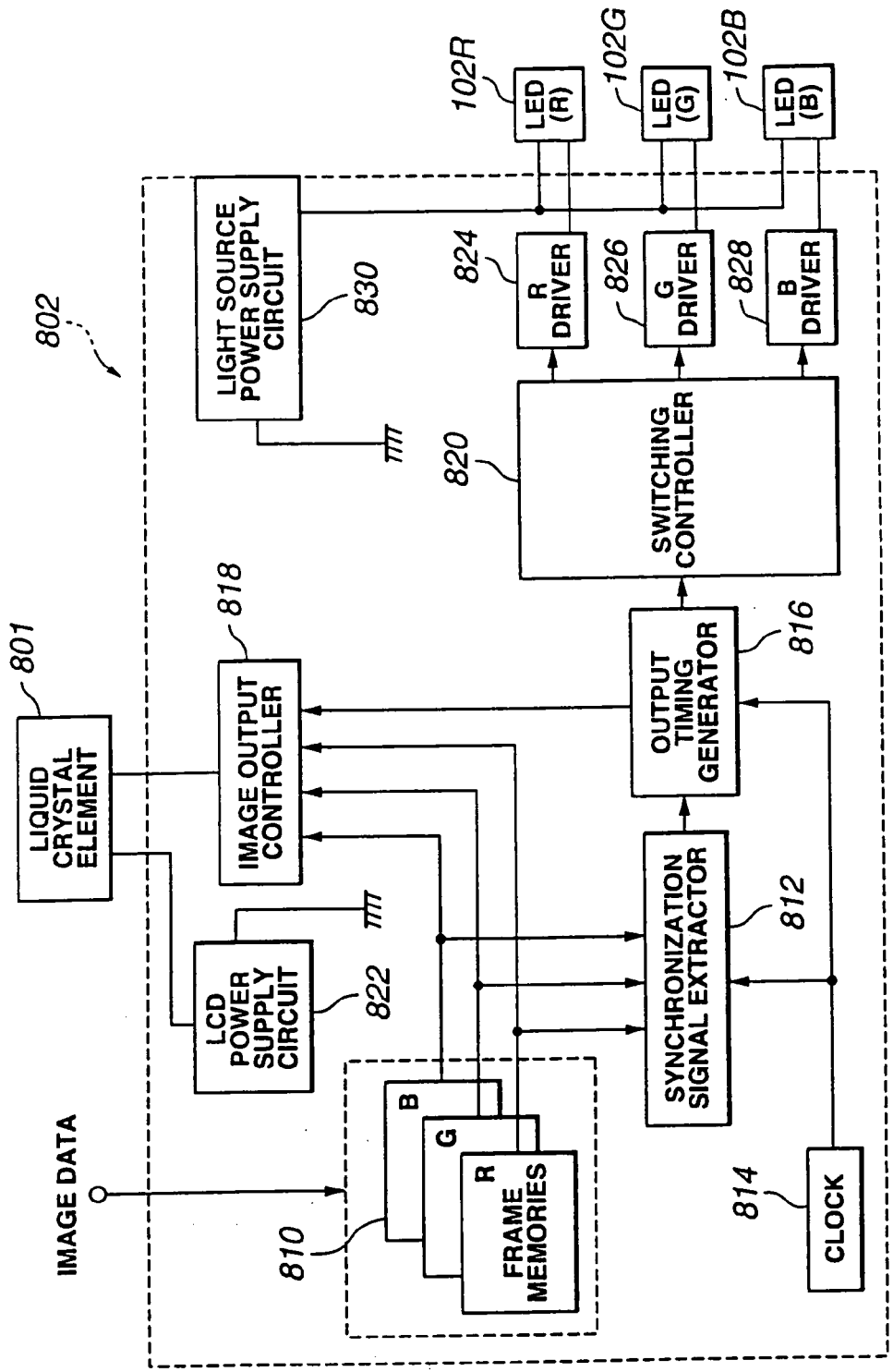
FIG. 10 is a detailed diagram of the display controller indicated in FIG. 9.
Figure 11:
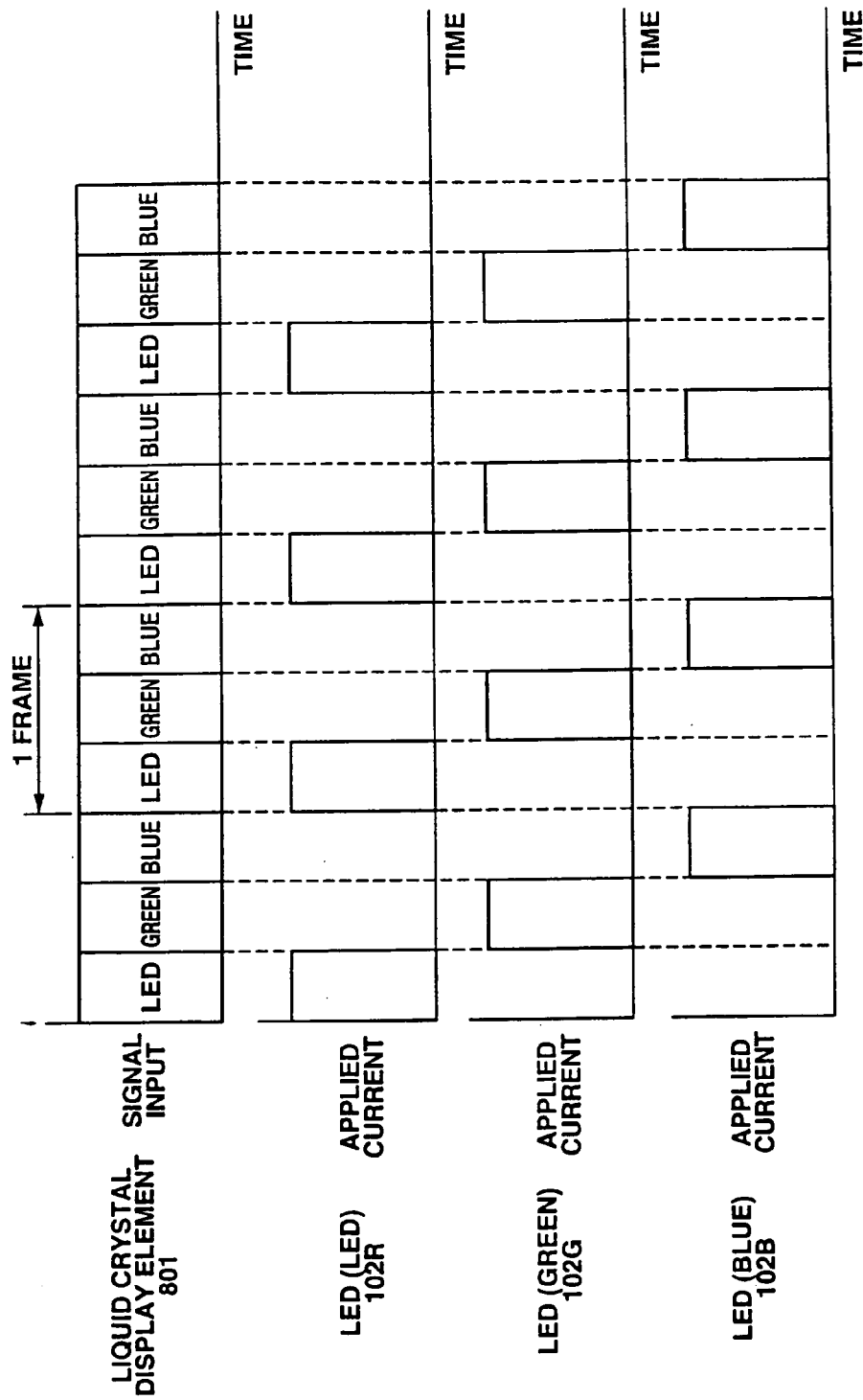
FIG. 11 is a timing chart indicating light source lighting and liquid crystal display element display timing in the second embodiment of the display device of the present invention.

A second embodiment of the display device of the present invention is described on the basis of FIG. 9 to 11. FIG. 9 is a diagram of the main optical system of the display device, as seen from above; FIG. 10 is a detailed block diagram of the control circuit in the display device; and FIG. 11 is a timing chart for the timing of light source lighting and liquid crystal display element displaying.

To the back side of a liquid crystal display element 801 is deployed the light source device described in the second embodiment of the light source device that is diagrammed in FIG. 2. The light source device is configured of a dichroic prism 101, LED 102R (red), LED 102G (green), LED 102B (blue), and lens arrays 201R, 201G, and 201B.

The lighting of the LEDs of each color and the driving of the liquid crystal display element are controlled by a display controller circuit 802.

In FIG. 10, a detailed diagram of the display controller circuit 802 is given. This display controller circuit 802 is provided with frame memories 810 corresponding to each color R, G, and B. Image data are temporarily stored in the frame memories 810 of each respective color. From the image data stored in the frame memories 810, synchronization signals are extracted by a synchronization signal extractor unit 812, and synchronization is effected by clock signals from a clock 814. The configuration is such that the synchronization signals are output to an output timing generator 816, and output both to an image output controller 818 which controls the driving of the liquid crystal display element 801 and to a switching controller 820 that controls the driving of the light emitting elements of each color.

To the image output controller 818 are input image data from the frame memories 810, and prescribed images are formed on the liquid crystal display element 801 by power supplied from an LCD (liquid crystal device) power supply circuit 822, based on the synchronization signals noted above.

Meanwhile, in the switching controller 820, in order to light the light emitting elements of colors corresponding to the images displayed by the liquid crystal display element 801, signals are sequentially switched and output to an R driver 824, a G driver 826, and a B driver 828. Thus the sequential lighting of the LEDs 102R, 102G, and 102B, in an order prescribed by RGB (and in synchronization with the order of image display to the liquid crystal display element 801) is repeated.

This control method is described with reference to FIG. 11. Red-component images, green-component images, and blue-component images are sequentially displayed within one field in the liquid crystal display element 801. The timing of LED lighting and of images displayed on the liquid crystal display element is controlled so that while the red-component image is being displayed the red LED 102R is lit, while the green-component image is being displayed the green LED 102G is lit, and while the blue-component image is being displayed the blue LED 102B is lit.

By performing color-sequence displays such as this, using the after image effect of the human eye, there ceases to be a necessity to provide the liquid crystal display element with color filters. The color filters used in the liquid crystal display element 701 in the display device of the first embodiment diagrammed in FIG. 8 absorb light of wavelengths other than the respective transmission wavelengths thereof. In contrast thereto, however, in the case of color-sequence display as in this embodiment, the light utilization efficiency from the light source to the screen can be enhanced.

In the display device of the first embodiment diagrammed in FIG. 8, moreover, the color-sequence display scheme described in the foregoing can be employed instead of using color filters in the liquid crystal display element 701 and the light utilization efficiency enhanced accordingly.

In the display of color images by a color-sequence drive, as described above, furthermore, the light from the RGB light sources is output after passing through the dichroic prism 101, wherefore the light axes of the light sources of the several colors coincide, and the liquid crystal display element can be illuminated by the light sources of the several colors in the same direction, wherefore a benefit is realized in that the color is not dependent on visual angle.

Third Embodiment of display Device

Figure 12:
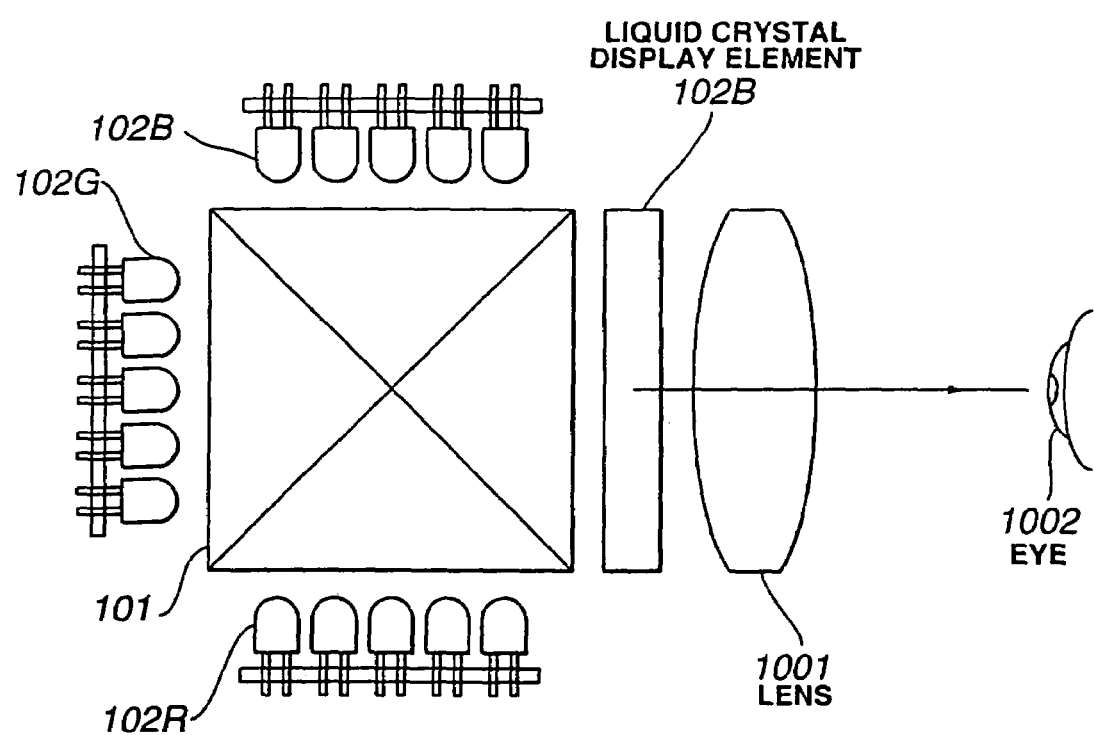
FIG. 12 is a diagram of the main optical system in a third embodiment of the display device of the present invention, as seen from above.

A third embodiment of the display device of the present invention is described on the basis of FIG. 12. FIG. 12 is a diagram of the main optical system of the display device, as seen from above.

On the back side of a liquid crystal display element 701 is deployed the light source device of the first embodiment diagrammed in FIG. 1. The light source device is configured of the dichroic prism 101, LED 102R (red), LED 102G (green), and LED 102B (blue), and the liquid crystal display element 701 is illuminated by white light synthesized from the red, green, and blue light.

The display device in this embodiment is a display device wherewith virtual images are viewed that pass through a lens 1001 and are magnified by the liquid crystal display element 701.

Fourth Embodiment of Display Device

Figure 13:
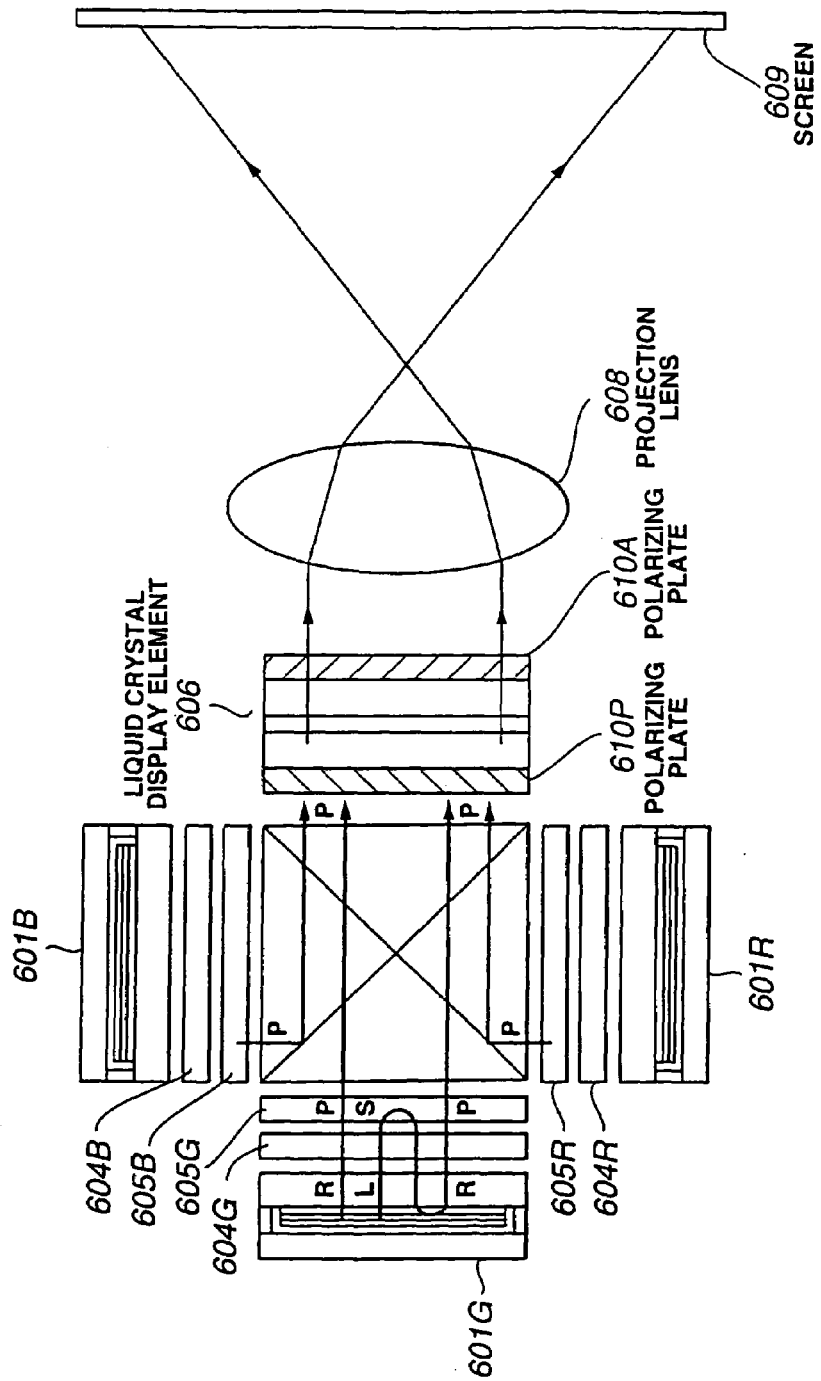
FIG. 13 is a diagram of the main optical system in a fourth embodiment of the display device of the present invention, as seen from above.

A fourth embodiment of the display device of the present invention is described on the basis of FIG. 13.

On the back side of a liquid crystal display device 606 is deployed the light source device described in the seventh embodiment as the light source device diagrammed in FIG. 7.

The light source device consists of the organic EL elements 601R, 601G, and 601B that comprise an optical resonator structure. On the front side of the organic EL elements 601R, 601G, and 601B are deployed the quarter-wave films 604R, 604G, and 604B and the reflecting polarizing plates 605R, 605G, and 605B.

As described in the light source device in the seventh embodiment, light output from the dichroic prism 101 is linearly polarized light P wherein the direction of oscillation is aligned.

The liquid crystal display element 606 is provided with an input-side polarizing plate 610P and an output-side polarizing plate 610A. However, by aligning the transmission axis of the input-side polarizing plate 610P with the direction of oscillation in the linearly polarized light P, the absorption of light by the polarizing plate 610P can be reduced, the light quantity that can be transmitted through the liquid crystal display element 606 can be increased, and the light from the light source device can be efficiently modulated by the liquid crystal display element 606.

The images displayed on the liquid crystal display element 606 are magnified and projected onto a screen 609 by a projection lens 608.

In cases where the liquid crystal display element 606 is provided with color filters in each pixel, color images can be projected by simultaneously lighting the red, green, and blue organic EL elements 601R, 601G, and 601B, and illuminating the liquid crystal display element with white light.

In cases where the liquid crystal display element 606 is not provided with color filters, on the other hand, color image displays can be made by employing a color-sequence drive for lighting the red, green, and blue EL elements 601R, 601G, and 601B, such as described in the second embodiment of the display device, in order, in one frame.

In displaying color images by such a color-sequence drive as noted above, furthermore, the light axis of the light sources of each color coincide, and illumination can be done from the same direction, wherefore a benefit is realized in that there is no color dependence on visual angle.

Fifth Embodiment of Display Device

Figure 14:
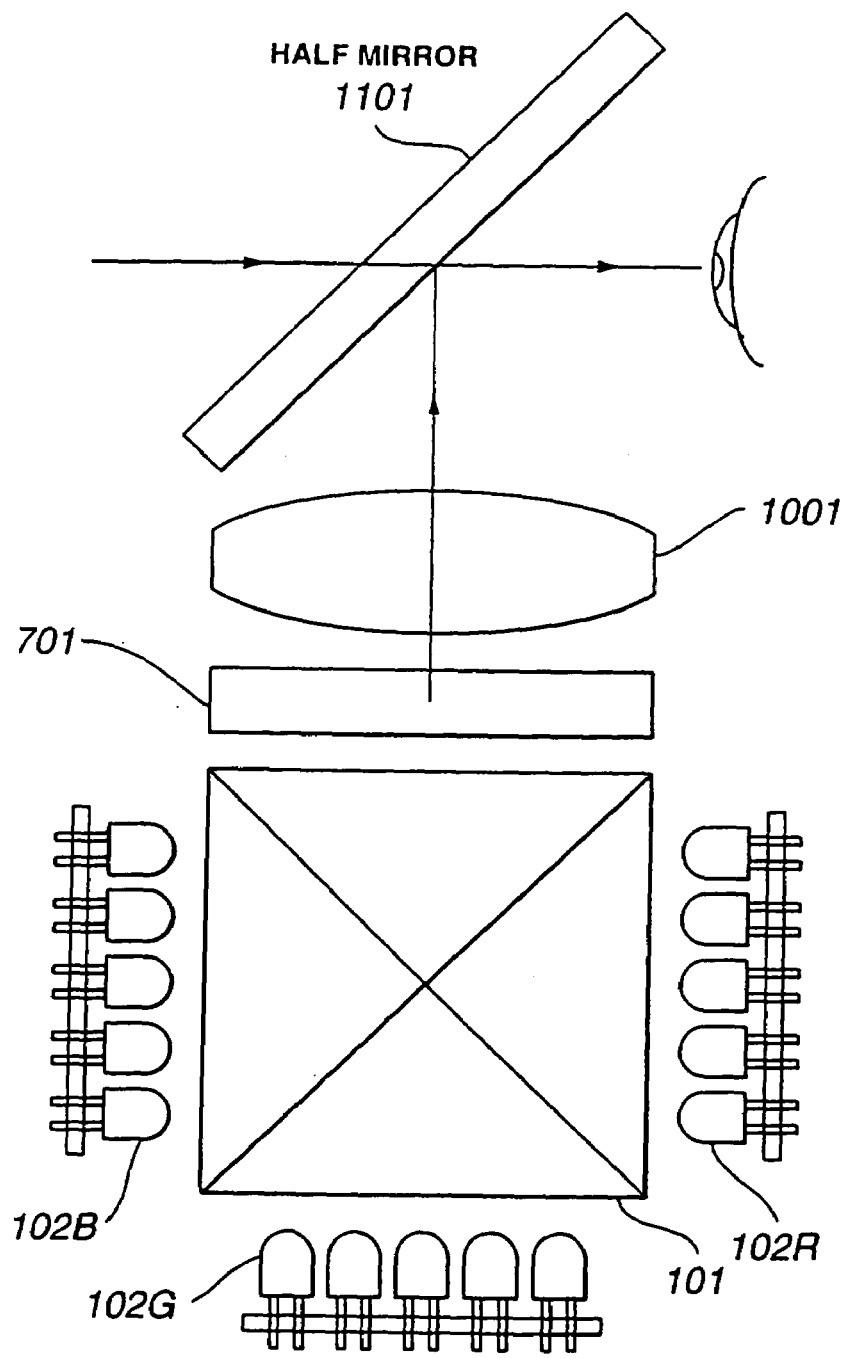
FIG. 14 is a diagram of the main optical system in a fifth embodiment of the display device of the present invention, as seen from above.

A fifth embodiment of the display device of the present invention is described on the basis of FIG. 14. FIG. 14 is a diagram of the main optical system of the display device, as seen from above.

The display device diagrammed in FIG. 14 has the same light source device and liquid crystal display device configuration as diagrammed in FIG. 13, with the only difference being the deployment of a half mirror 1101 between a lens 1001 and the eye 1002 of an observer.

The half mirror 1101 enables magnified images of the liquid crystal display element 701 to be viewed superimposed on the outside world 1102.

If there is no need to view the outside world, then a fully reflecting mirror may be used in place of the half mirror.

The light sources employed for effecting color-sequence drive in the embodiment aspects, particularly in the embodiment aspects of the display device, are not limited to point light sources like LEDs, but may be planar light sources such as organic EL elements or flat-panel fluorescent tubes, etc.

In the embodiments described in the foregoing, in terms of the form of the display device, the descriptions are for examples wherein transmissive type liquid crystal display elements are used. The present invention is not limited thereto or thereby, however, and optical devices are also provided by the present invention wherein reflective type liquid crystal display elements that reflect light from a light source, or light valves wherewith images are formed using a deformable mirror, or light modulating devices of a type that reflect light from the outside, such as spatial modulation elements, etc., are combined as light modulating members or means together with light sources.

INDUSTRIAL APPLICABILITY

As based on the light source device of the present invention, as described in the foregoing, by providing light sources wherewith the light emission efficiency is maximized in wavelengths for red, green, and blue, respectively, and synthesizing the light from those light sources with a dichroic prism, a benefit is realized in that a small light source device can be configured wherewith bright white light can be generated.

By illuminating light modulating elements such as liquid crystal display elements by such a light source device, a benefit is realized in that a small display device can be configured. Furthermore, by lighting the light sources for red, green, and blue light in order, and causing, in synchronization therewith, red-, green-, and blue-component images to be displayed on the liquid crystal display element or other light modulating element, a benefit is realized in that the brightness of a small display device comprising a single light modulating element can be enhanced.

The invention claimed is:

1. A light source device, comprising:
a first light source for emitting a first light;
a second light source for emitting a second light;
a third light source for emitting a third light;
a first reflector disposed at the first light source;
a second reflector disposed at the second light source;
a third reflector disposed at the third light source;
a first polarization converter for obtaining a first polarized light from the first light, the first polarization converter including a first polarizer through which the first polarized light is obtained and utilizing a first reflection light reflected by the first polarizer and the first reflector so as to obtain the first polarized light;

a second polarization converter for obtaining a second polarized light from the second light, the second polarization converter including a second polarizer through which the second polarized light is obtained and utilizing a second reflection light reflected by the second polarizer and the second reflector so as to obtain the second polarized light;

a third polarization converter for obtaining a third polarized light from the third light, the third polarization converter including a third polarizer through which the third polarized light is obtained and utilizing a third reflection light reflected by the third polarizer and the third reflector so as to obtain the third polarized light; and a color synthesizing optical system for synthesizing the first polarized light, the second polarized light and the third polarized light.

2. The light source device according to claim 1, the first color being a color in a region from orange to red, the second color being a color in a region from green to yellow-green, and the third color being a color in a blue region.

3. The light source device according to claim 1, the first, second and third light sources being light emitting diodes.

4. The light source device according to claim 3, a plurality of the light emitting diodes being deployed two-dimensionally in the first, second and third light sources, respectively.

5. The light source device according to claim 4, further comprising lenses deployed between the first, second and third light sources and the color synthesizing optical system.

6. The light source device according to claim 4, further comprising lens array elements deployed between the first, second and third light sources and the color synthesizing optical system.

7. The light source device according to claim 1, each of the first, second and third light sources being a planar light source.

8. The light source device according to claim 1, the first, second and third light sources being flat-panel fluorescent tubes.

9. The light source device according to claim 1, the first, second and third polarizers being reflecting polarizing plates.

10. The light source device according to claim 1, the first, second and third light sources being flat-panel electroluminescent elements.

11. The light source device according to claim 10, the electroluminescent elements being organic electroluminescent elements having organic thin films as a light emitting layer.

12. The light source device according to claim 11, the organic electroluminescent elements comprising optical resonators in light emitting layer structures thereof.

13. The light source device according to claim 9, the first, second and third polarization converters further comprising:
quarter-wave films, the quarter-wave films being deployed on sides toward the first, second and third light sources.

14. The light source device according to claim 1, the first, second and third light sources being lit simultaneously.

15. The light source device according to claim 1, the first, second and third light sources repeatedly being lit in order.

16. A display device, comprising:
a light modulating element; and
the light source device according to claim 1,
light from the light source device being modulated in the light modulating element and light so modulated being magnified by a projection lens and displayed.

17. The display device according to claim 16, the light modulating element comprising a transmissive type liquid crystal element and the light source device being deployed opposite one face of the liquid crystal element, and images formed on the liquid crystal element being magnified by the projection lens and displayed.

18. The display device according to claim 17, color filters being formed in pixels configuring the liquid crystal display element.

19. The display device according to claim 16, the light modulating element being a reflecting type light modulating element and the light source device being deployed opposite reflecting surface of the light modulating element.

20. A display device, comprising:
a light modulating element; and
the light source device according to claim 1,
light from the light source device being modulated in the light modulating element,
light so modulated being magnified by a projection lens and displayed as an image,
the light modulating element forming, with time division, a first color component image, a second color component image and a third color component image,
the first light source in the light source device being lit during a time interval, the first color component image being formed,
the second light source in the light source device being lit next during the time interval, the second color component image being formed, and
the third light source in the light source device being lit next during the time interval, the third color component image being formed, and
a color image being displayed by sequential display of the first, second and third color components in the light modulating element, and by sequential lighting of the first, second and third light sources corresponding to those sequential displays.

* * * * *